(12) United States Patent
Verrat-Debailleul et al.

(10) Patent No.: US 9,689,194 B2
(45) Date of Patent: Jun. 27, 2017

(54) PROCESS AND DEVICE FOR MANUFACTURING A GLAZING UNIT COMPRISING A DECORATIVE FILM, AND GLAZING UNIT COMPRISING A DECORATIVE FILM

(75) Inventors: Adele Verrat-Debailleul, Villers sur Coudon (FR); Pascal Lefevre, Viry Noureuil (FR); Loic Froissard, Choisy-Au-Bac (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 468 days.

(21) Appl. No.: 13/641,351

(22) PCT Filed: Apr. 15, 2011

(86) PCT No.: PCT/FR2011/050871
§ 371 (c)(1),
(2), (4) Date: Dec. 20, 2012

(87) PCT Pub. No.: WO2011/128603
PCT Pub. Date: Oct. 20, 2011

(65) Prior Publication Data
US 2013/0086854 A1    Apr. 11, 2013

(30) Foreign Application Priority Data
Apr. 16, 2010  (FR) ..................... 10 52906

(51) Int. Cl.
*B60J 10/02* (2006.01)
*E06B 1/04* (2006.01)
(Continued)

(52) U.S. Cl.
CPC .............. *E06B 1/04* (2013.01); *B44C 1/1712* (2013.01); *B29L 2031/7782* (2013.01); *Y10T 156/10* (2015.01)

(58) Field of Classification Search
CPC ..................... B29L 2031/7782; B60J 10/0051
(Continued)

(56) References Cited

U.S. PATENT DOCUMENTS 3,318,826 A * 5/1967 Bridgeford ............... C08F 2/44
523/205
3,520,751 A * 7/1970 Cranfill .................. B65C 9/1811
156/209

(Continued)

FOREIGN PATENT DOCUMENTS

EP    0 371 810 A2    6/1990
EP    1 052 115 A2    11/2000
(Continued)

OTHER PUBLICATIONS

Charlie Sorrel, Bye-bye cassette tape: UK chain kills romantic format, May 2007, www.wired.com/2007/05/byebye_cassette/.*
(Continued)

*Primary Examiner* — Scott W Dodds
(74) *Attorney, Agent, or Firm* — Oblon, McClelland, Maier & Neustadt, L.L.P.

(57) ABSTRACT

The invention relates to a process for manufacturing a glazing unit (1) comprising a glazed element (2) optionally equipped with a portion of a profiled strip (3), said glazing unit (1) having at least one flexible part and/or one hard part, said flexible part belonging to said profiled strip (3) and said hard part belonging to said glazed element (2) or to said profiled strip (3), characterized in that at least one film (4) comprising a substrate (40) having a rear face (41) and a front face (42), on which a decorative coating (45) is positioned, is applied to said glazing unit (1), the film (4) being pressed against the glazing unit by applying at least one punch (54) against the rear face (41) of the substrate (40).

15 Claims, 3 Drawing Sheets (51) Int. Cl.
  *B44C 1/17* (2006.01)
  *B29L 31/00* (2006.01)

(58) Field of Classification Search
  USPC .................................. 156/251, 261; 427/146
  See application file for complete search history.

(56) References Cited

U.S. PATENT DOCUMENTS

| | | | | |
|---|---|---|---|---|
| 3,612,322 | A | * | 10/1971 | Linkletter ............ B65D 50/065 |
| | | | | 215/225 |
| 3,886,020 | A | * | 5/1975 | Shank, Jr. ..................... 156/211 |
| 4,150,995 | A | * | 4/1979 | Moritsu .................... C03C 8/18 |
| | | | | 106/1.11 |
| 4,849,265 | A | * | 7/1989 | Ueda ....................... B44C 1/105 |
| | | | | 428/142 |
| 4,890,656 | A | * | 1/1990 | Ohsumi et al. ............... 144/350 |
| 5,164,032 | A | * | 11/1992 | Salama et al. ................ 156/242 |
| 5,197,243 | A | | 3/1993 | Mozawa et al. |
| 5,250,321 | A | * | 10/1993 | Andersson ............... B41M 1/12 |
| | | | | 101/126 |
| 5,620,648 | A | * | 4/1997 | Volkmann et al. ........... 264/511 |
| 6,241,842 | B1 | * | 6/2001 | Nagele ..................... B44C 1/16 |
| | | | | 156/230 |
| 6,300,030 | B1 | | 10/2001 | Weinberg et al. |
| 6,562,172 | B1 | | 5/2003 | Kamen et al. |
| 6,676,792 | B1 | | 1/2004 | Fenzi |
| 2004/0079488 | A1 | | 4/2004 | Fenzi |
| 2004/0188005 | A1 | | 9/2004 | Pearson |

FOREIGN PATENT DOCUMENTS

| | | |
|---|---|---|
| WO | WO 98/08694 | 3/1998 |
| WO | WO 98/43832 | 10/1998 |
| WO | WO 00/09332 | 2/2000 |

OTHER PUBLICATIONS

International Search Report issued Oct. 19, 2011 in Application No. PCT/FR2011/050871.

* cited by examiner

PROCESS AND DEVICE FOR MANUFACTURING A GLAZING UNIT COMPRISING A DECORATIVE FILM, AND GLAZING UNIT COMPRISING A DECORATIVE FILM

CROSS REFERENCE TO RELATED APPLICATIONS

The present application is a 35 U.S.C. §371 national stage patent application of International patent application PCT/FR2011/050871, filed on Apr. 15, 2011, published as WO 2011/128603 on Oct. 20, 2011, the text of which is incorporated by reference, and claims the benefit of the filing date of French Application No. 1052906, filed on Apr. 16, 2010, the text of which is also incorporated by reference.

The present invention relates to the field of the manufacture of glazing units.

It relates to a process and to a device for manufacturing a glazing unit comprising a glazed element optionally provided with a portion of a profiled strip, said glazing unit having at least one flexible part and/or one hard part, said flexible part belonging to said profiled strip if it is present and said hard part belonging to said glazed element or to said profiled strip.

The present invention relates in particular to the manufacture of glazing units comprising at least one decorative element that is visually different from the appearance of the rest of the glazing unit.

Known from the prior art, from international patent application WO 2005/033526, is a system for the clip-fastening of decorative molding profile for a profiled strip using a flexible clip that has a first simple protrusion intended to be introduced into a first simple groove of the profiled strip and a second more complex, hook-shaped protrusion, intended to be introduced into an equally more complex groove of the profiled strip via deformation of the flexible clip. The clip is thus hooked onto the profiled strip. A pinching effect of the profiled strip is furthermore obtained by creating a slightly shorter distance between the two protrusions of the clip than between the two grooves of the profiled strip.

In this solution, the decoration is therefore created by clip-fastening a decorative part (the molding profile) to the profiled strip of the glazing unit.

This system is satisfactory, but makes it necessary to provide a two-fold supply: of decorative parts and of clips.

Furthermore, a process and device for bonding a decorative part, without using an intermediate clip, is known from international patent application WO 2009/068624.

However, the use of a large amount of adhesive between the glazing unit and the decorative part imposes high health and safety constraints in the production departments and generates a high financial cost.

Furthermore, known from the prior art, from European patent application EP 371 810, is a particular and complex technology: a profiled strip is first prefabricated, then the glazing unit is placed in a mold with this profiled strip and high-frequency waves are sent into predetermined zones of the mold in order to heat the profiled strip and give rise to an evaporation and an expansion of a foamed portion of the profiled strip.

Furthermore, known from the prior art, from international patent application WO 98/43832, is a technology known as "decal deposition"; in reality, the subject of this document is what a person skilled in the art refers to as enamel screen printing since the temperatures used for marking the glazed element are very high (more than 500° C.).

The objective of the invention is to overcome the drawbacks of the prior art by proposing a system for decorating glazing units that is simple, easy to use and inexpensive.

The present invention thus relates, in its broadest sense, to a process for manufacturing a glazing unit according to claim 1. The glazing unit thus manufactured comprises a glazed element equipped with a portion of a profiled strip, said glazing unit having at least one flexible part and/or one hard part, said flexible part belonging to said profiled strip and said hard part belonging to said glazed element or to said profiled strip; according to the invention, at least one film comprising a substrate having a rear face and a front face, on which a decorative coating is positioned, is applied to said glazing unit by successively carrying out the following steps:

a—the glazing unit is positioned on a support comprising a counter-form,
b—the film is pressed at least partially against a flexible part of the profiled strip of the glazing unit, and in particular a part of the profiled strip which is flexible and protrudes (is not recessed), by applying at least one punch against the rear face of the substrate,
c—this punch is raised and
d—said substrate is withdrawn,
said decorative coating then adhering to said glazing unit.

The expression "decorative coating" should be understood, in the sense of the present invention, to mean that the element has a fine thickness, of the order of 0.1 to 1 mm. This element is relatively flexible since it comprises a polymer matrix. It may not be constituted of a sheet of metal or of metal alloy. Only this decorative coating adheres to the glazing unit; the substrate bearing the decorative coating before the application of the decorative coating is removed from this decorative coating in order to be then thrown away or recycled.

The expression "part of the profiled strip which is protruding" should be understood, in the sense of the present invention, to mean that at least one part of the strip onto which the film is pressed and to which the decorative coating adheres is a part which protrudes relative to the outer face of the glazed element, that is to say that lies more on the outside than the outer face of the glazed element; this part is not therefore in the continuity of the outer face, neither more on the inside than the outer face of the glazed element, with respect to the edge of the glazed element, nor more on the inside still.

An important feature of the present invention consists in providing that during step b the punch presses the film at least partially against a flexible part of the profiled strip and optionally at the same time:
   the punch presses the film at least partially against a hard part of the profiled strip and/or
   the punch presses the film at least partially against a portion of a face of said glazed element (said face portion being a hard part of a glazed element made of mineral glass or made of organic material).

However, it is preferable for the punch to press the film in its entirety against a flexible part of the profiled strip since it is more difficult to control the application of a film to a surface having two different zones with different hardness properties.

The coating preferably adheres to a flexible part of the outer face of the profiled strip which is protruding relative to another part of the outer face of the profiled strip; this other part may be flexible or rigid.

In one variant of the invention, when the glazing unit is positioned on a support, said flexible part is positioned on said counter-form.

In one variant of the invention, during step b the punch presses the film at least partially against an outer face of the flexible part of the profiled strip, with an inner face of the flexible part of the profiled strip which is supported by the counter-form.

Preferably, furthermore, during step b at least, or even during all the steps, the punch is heated, preferably with a permanent control of its temperature.

In one preferred variant of the invention, said film is wound onto a roll which is unwound before pressing the film against the glazing unit, the substrate then being preferably wound up after pressing the film.

During step b, the pressing is preferably carried out:
over a period between 1 and 20 seconds, or even between 2 and 5 seconds and/or
at a pressure between 0.1 and 10 MPa, or even between 0.2 and 2 MPa and/or
at a temperature between 80 and 150° C., or even between 100 and 130° C.

The punch preferably presses the film against a flexible part of the profiled strip which is curved, with optionally at the same time:
the punch which presses the film at least partially against a hard part of the profiled strip which is curved and/or
the punch which presses the film at least partially against a face of said glazed element that is curved.

It is easier to press the film against a flexible part of the profiled strip which is protruding and which is not recessed.

It is easier to press the film against a protruding part of an outer face of the flexible part of the profiled strip, with an inner face of the flexible part of the profiled strip which is supported by the counter-form.

During this step b, it is possible for the punch to press the film against several lateral edges of the glazing unit and in particular against the entire lateral perimeter of the glazing unit. It is also possible to use several punches that each press a film in several locations of each glazing unit.

In the sense of the present invention, a flexible part is a part that exhibits an indentation when pressure is applied to it using a bare hand, whereas a hard part does not exhibit any indentation when pressure is applied to it using a bare hand.

The counter-form is inevitably a structural element that opens, and is not closed, as it is necessary to be able to apply the punch and to withdraw it.

The punch is a solid element; it is not a perforated screen such as those used in screen printing; the technique of the invention is not a screen printing technique (which uses an ink).

The present invention also relates to a device for manufacturing a glazing unit, in particular for the implementation of the process according to the invention, said device comprising a glazed element equipped with a portion of a profiled strip, said glazing unit having at least one flexible part and/or one hard part, said flexible part belonging to said profiled strip and said hard part belonging to said glazed element or to said profiled strip. This device according to the invention comprises a support comprising on the one hand a counter-form that receives said glazing unit and on the other hand at least one movable punch in order to press at least partially against a flexible part of the profiled strip of the glazing unit a film comprising a substrate having a rear face and a front face, on which a decorative coating is positioned, in order that said decorative coating adheres to said glazing unit.

In this device, said punch also preferably comprises a rotatably mounted roller or a translatably mounted pad.

The present invention also relates to the glazing unit comprising a glazed element equipped with a portion of a profiled strip, said glazing unit having at least one flexible part and one hard part, said flexible part belonging to said profiled strip and said hard part belonging to said glazed element or to said profiled strip and in particular a glazing unit obtained by the implementation of the process according to the invention, this glazing unit comprising at least one decorative coating that adheres to a flexible part of the profiled strip of said glazing unit, and in particular that adheres to a protruding flexible part of the profiled strip of said glazing unit.

This glazing unit thus preferably comprises at least one decorative coating adhering to a flexible part of the profiled strip and optionally
said coating adhering to a hard part of the profiled strip and/or
said coating adhering to a face of said glazed element.

In one variant, said decorative coating comprises a pigmented matrix sandwiched between a heat-activated adhesive and a layer of non-stick agent. This agent is intended to facilitate the removal of the substrate; it is possible for it to subsequently disappear from the glazing unit, especially after intense cleaning.

It is possible to produce the decorative coating so that it comprises a double curvature (a longitudinal curvature and a transverse curvature).

Said decorative coating may be located on one (or more) lateral edge(s) of the glazing unit and especially over the entire lateral perimeter of the glazing unit, and in particular said decorative coating may adhere:
to a flexible part of the profiled strip along several lateral edges of the glazing unit and/or
to a hard part of the profiled strip along several lateral edges of the glazing unit and/or
to a face of said glazed element along several lateral edges of the glazing unit.

The present invention also relates to a set of glazing units (or a series of glazing units), and in particular a set of vehicle glazing units, each comprising a glazed element optionally provided with a portion of a profiled strip, each glazing unit having at least one flexible part and/or one hard part, said flexible part belonging to said profiled strip and said hard part belonging to said glazed element or to said profiled strip.

In this set of glazing units (or this series of glazing units) according to the invention, only one portion of the glazing units of the set is obtained by the implementation of the process according to the invention.

Thus, said glazing units of the set are identical except that one portion of the glazing units of the set each comprises at least one decorative coating that adheres to said glazing unit and that another portion of the glazing units of the set do not comprise any decorative coating; it is furthermore possible that within the portion of the glazing units comprising at least one decorative coating, the glazing units do not all have the same decorative coating (coatings of different color and/or of different appearance).

The present invention also relates to a set of glazing units, and in particular a set of vehicle glazing units, according to the invention, each comprising a glazed element equipped with a portion of a profiled strip, each glazing unit having at least one flexible part and one hard part, said flexible part belonging to said profiled strip and said hard part belonging to said glazed element or to said profiled strip, and said glazing units of the set are identical except that some glazing units of the set each comprise at least one different decorative coating.

The present invention also relates to the use, in a glazing unit production department and in particular in a vehicle glazing unit production department, of a device according to the invention comprising a stamping machine to manufacture glazing units according to the invention and in particular to manufacture vehicle glazing units.

Stamping technology is certainly known, but up until now it was applied to rigid parts, not to flexible parts.

This use thus makes it possible to manufacture glazing units that are identical except that one portion of the glazing units each comprises at least one decorative coating that adheres to said glazing unit and that another portion of the glazing units does not comprise any decorative coating; it is furthermore possible that within the portion of the glazing units comprising at least one decorative coating, the glazing units do not all have the same decorative coating (coatings of different color and/or of different appearance).

Advantageously, the system according to the invention makes it possible to produce glazing units decorated with a decorative coating in a simple, precise and inexpensive manner, by greatly reducing the risks relating to health and safety in the production departments.

Also advantageously, the solution according to the invention makes it possible to propose to motor vehicle manufacturers a single design of profiled strip or a single design of glazing unit, whether this profiled strip or this glazing unit is decorated with a decorative coating or not; indeed, with the prior art systems having a clipped or bonded molding, if the manufacturer wants to be able to propose, for a same type of vehicle, a version with a decorated glazing unit and a version with a glazing unit having no decoration, two types of glazing units had to be designed: one type of glazing unit with specific means (recess, protrusion, adhesive bonding region, etc.) for the attachment of the molding and one type of glazing unit without these means.

Also advantageously, the present invention proposes a solution for decorating flexible parts of glazing units, which was not possible to date. Indeed, it is not possible to clip fasten a molding to a flexible part, such as a lip that protrudes outwards from the edge of the glazing unit, since the risk of it becoming unfastened when the vehicle is running is too great; likewise, the adhesive bonding of a massive part risks not being sufficiently effective and the molding risks becoming unstuck. Surprisingly, it has been discovered that it was possible to apply a decorative coating to a flexible part: this coating, due to its small thickness, will follow the deformation of the flexible part (the prime objective of which is that it deforms) and the decorative function will be retained over time.

The present invention will be better understood on reading the following detailed description of nonlimiting exemplary embodiments and on examining the appended figures.

In these figures, the proportions between the various elements are not to scale and the backgrounds elements are not generally represented, in order to facilitate the examination thereof.

The present invention relates to the manufacture of a glazing unit and especially a vehicle glazing unit and in particular to the manufacture of a motor vehicle glazing unit.

The glazing unit 1 according to the invention comprises a glazed element 2 which is rigid and hard and which is provided with a portion of a profiled strip 3, said glazing unit 1 having at least one flexible part and/or one hard part, said flexible part belonging to said profiled strip 3 and said hard part belonging to said glazed element 2 or to said profiled strip 3.

The glazing unit, which at least consists of the glazed element and of the profiled strip, and also optionally of accessories and in particular of accessories for fastening the glazing unit, is intended to seal an opening that creates a separation between an internal space and an external space. The glazed element thus has an inner face, intended to be turned toward the internal space, an outer face intended to be turned towards the external space, and also a peripheral edge.

The glazed element may be monolithic, that is to say constituted of a single sheet of material, or be composite, that is to say constituted of several sheets of material between which at least one layer of adherent material is inserted in the case of laminated glazing units, or between which at least one intermediate space is present in the case of multiple glazing units (double glazing units, triple glazing units, etc.). The sheet(s) of material may be mineral, in particular made of glass, or organic, in particular made of plastic.

In the case of a vehicle glazing unit, the glazing unit generally has, at least partially at its periphery, an ornamental strip, not illustrated here. This ornamental strip is generally formed by depositing an enamel on the inner face of the glazing unit or on an intermediate face of the glazing unit for composite glazing units, but it may also result from partial and/or peripheral coloration of a sheet of material used, especially a sheet of organic material.

When the glazed element is made of organic material, it has been manufactured previously by molding the constituent material of the glazed element in a molding device comprising a mold that comprises at least one fixed mold section and one movable mold section which can be moved relative to the fixed mold section, said mold sections cooperating in the closed state of the mold, during the molding step, in order to form a molding cavity that has, in cross section, the shape in cross section of the glazed element. Often, the glazed element made of organic material is not flat but curved.

When the glazed element is made of mineral material, it has been manufactured by melting mineral material into a flat sheet, then by cutting this sheet and optionally curving this sheet.

For information, the manufacture of a glazed element made of organic material is more expensive than the manufacture of a glazed element made of mineral material and the first method of manufacture is generally chosen when the shape of the glazed element is so complex that it cannot be produced by bending a glazed element made of mineral material or else when it is desired for the glazed element to be light.

When the glazed element is a composite glazed element, it has been manufactured according to the well-known technique of manufacturing multiple glazing units or laminated glazing units, which are optionally curved.

In FIGS. 1 to 6, it is not a complete glazed element that is denoted, but only a lateral edge of a glazed element that is monolithic: this could be a left or right edge, a front or rear edge, or a top or bottom edge (the orientation here being relative to a motor vehicle and in accordance with its direction of forward motion, as known).

The glazing unit comprises a profiled strip which has been previously manufactured from a plastic material by molding to the periphery of the glazed element in order to form a glazing unit and in particular a vehicle glazing unit.

The constituent plastic of the profiled strip may be a thermoplastic (PVC, TPE, etc.), a polyurethane or else a synthetic rubber of EPDM type, or any other suitable material.

The profiled strip is generally placed over the entire periphery of the lateral edges of the glazed element but this profiled strip could just as well be positioned only over a portion of the periphery of the glazing unit or over any portion of the glazing unit.

The profiled strip was manufactured beforehand by employing what is called an "encapsulation" manufacturing process as it includes a step of molding the profiled strip in a molding device, comprising a mold that comprises at least one fixed mold section and one movable mold section which can move relative to the fixed mold section, said mold sections cooperating in the closed state of the mold, during the molding step, with said glazed element in order to form a molding cavity that has, in cross section, the shape of the profile of the profiled strip.

According to the invention, in order to manufacture the glazing unit 1, after manufacture of the glazed element and after manufacture of the profiled strip, a decorative coating is attached to a flexible part, or even to a flexible part and a hard part of the glazing unit, using a film 4 comprising a substrate 40 having a rear face 41 and a front face 42, on which a decorative coating 45 is positioned.

Figure 1:
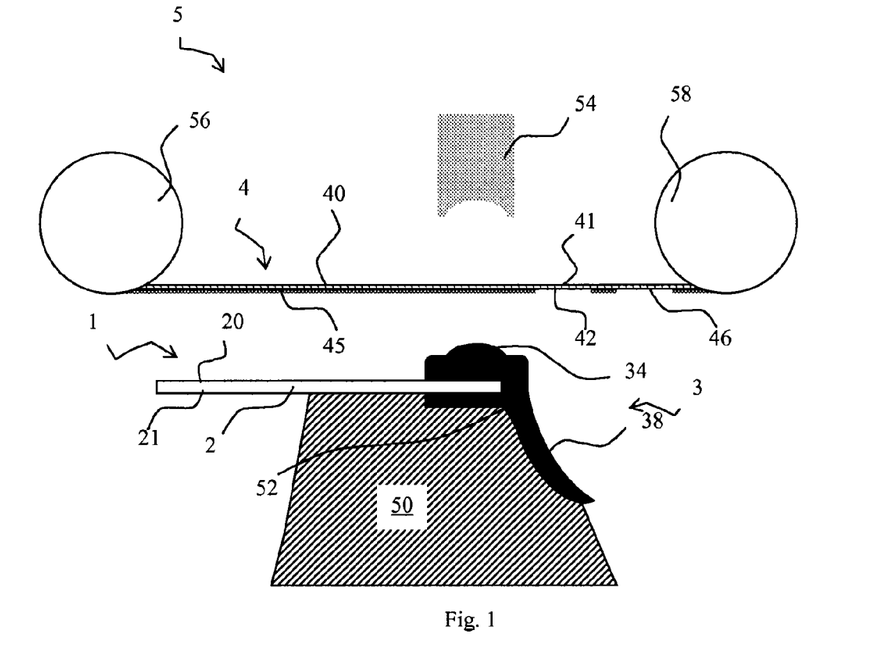
FIG. 1 illustrates a schematic cross-sectional view of the first essential step of the process for manufacturing a glazing unit according to the invention.
Figure 2:
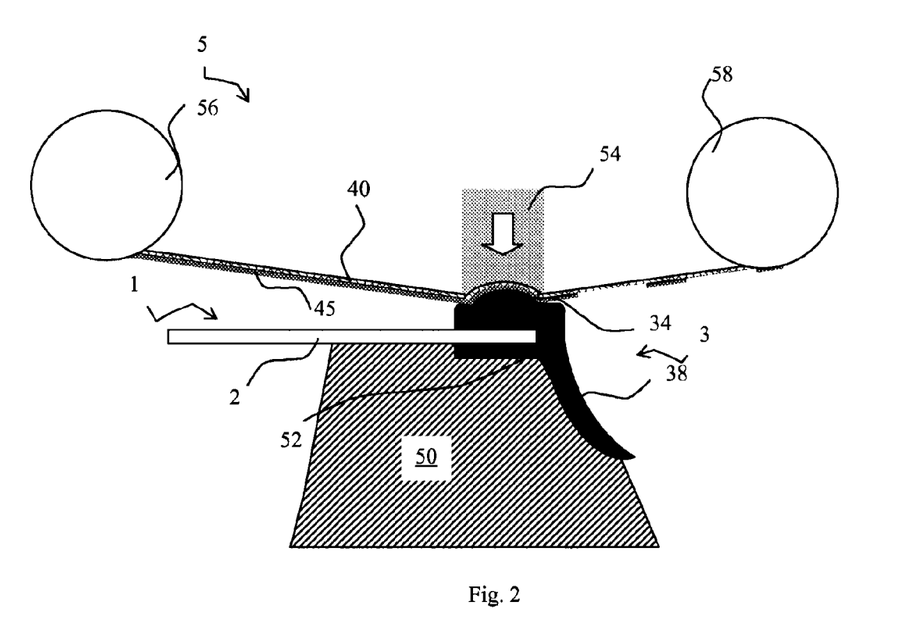
FIG. 2 illustrates a schematic cross-sectional view of the second essential step of the process for manufacturing a glazing unit according to the invention.
Figure 3:
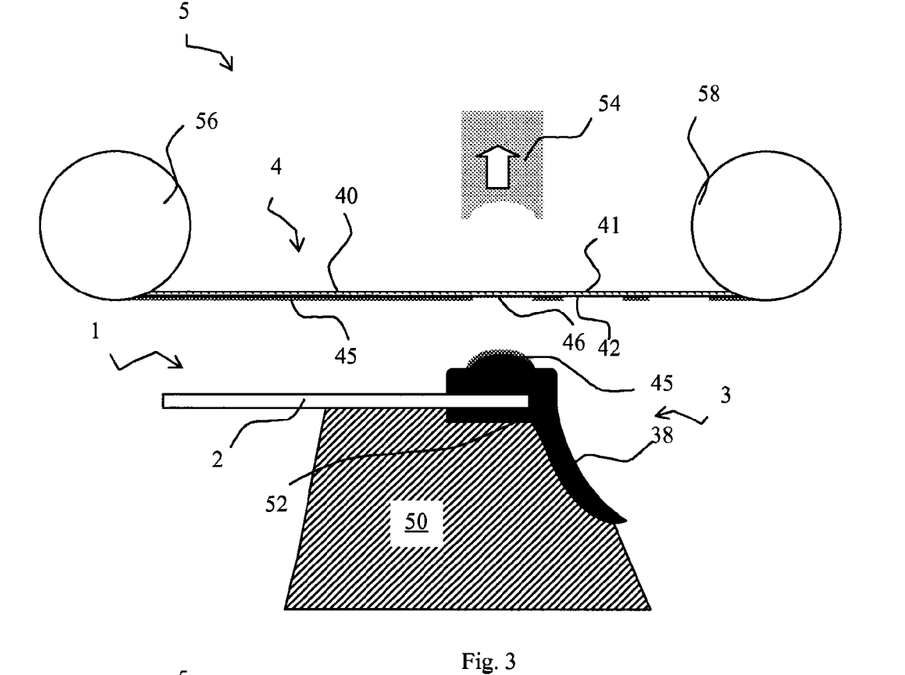
FIG. 3 illustrates a schematic cross-sectional view of the third essential step of the process for manufacturing a glazing unit according to the invention.
Figure 4:
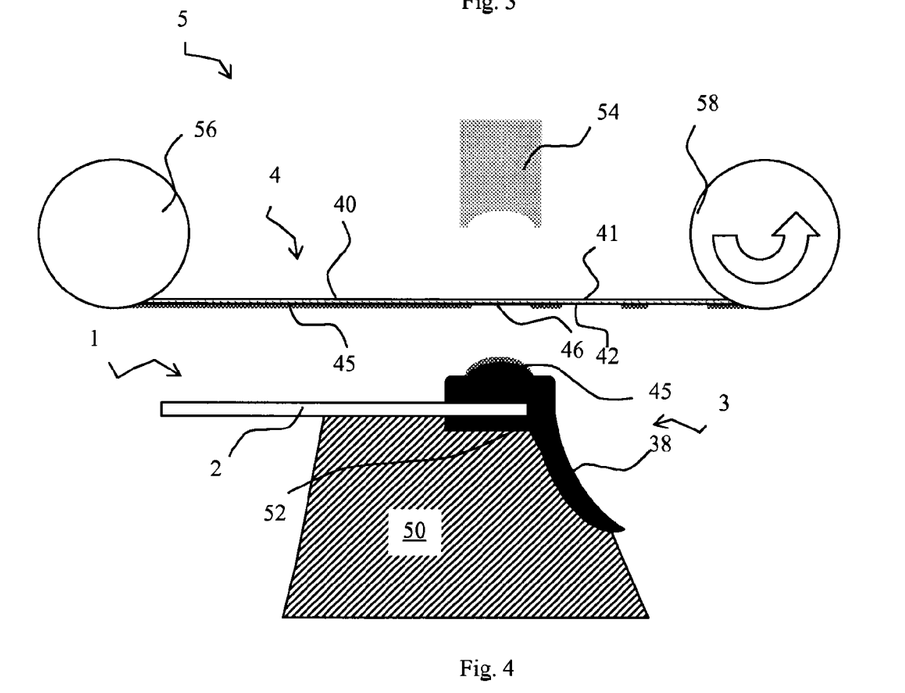
FIG. 4 illustrates a schematic cross-sectional view of a fourth step of the process for manufacturing a glazing unit according to the invention which could optionally be carried out at the same time as the third step.

In order to do this, four essential steps are successively carried out:

a—first essential step (positioning): the glazing unit is firstly positioned on a support 50 of a manufacturing device 5 which comprises a counter-form 52 which receives the glazing unit, as can be seen in FIG. 1;

b—second essential step (pressing): at least one punch 54 is positioned against a rear face 41 of the substrate 40 and the film 4 is pressed against the glazing unit by the punch 54 in order to detach the decorative coating from the substrate and apply the decorative coating to the glazing unit, as can be seen in FIG. 2;

c—third essential step (withdrawal): this punch 54 is raised in order to break off the film/glazing unit contact, as can be seen in FIG. 3; and d—fourth essential step (removal): said substrate 40 is withdrawn in order to remove the part of the film 4 which comprises no more than the substrate 40 and which no longer comprises the portion of the decorative coating which was applied to the glazing unit, as can be seen in FIG. 4.

To complete the production cycle, before starting it again at step a, it is of course necessary to remove the glazing unit thus manufactured.

Furthermore, it is possible to carry out steps c and d simultaneously or virtually simultaneously (that is to say to start step d when step c is not finished) and it is possible to clean the glazed element and/or to apply a primer before the pressing step b.

It is in the pressing step that a portion of the decorative coating 45 leaves the substrate 40 in order to be placed on a part of the glazing unit in order to decorate this part.

Thus, the decorative coating 45 then adheres to the glazing unit 1.

More specifically, during the second essential step, step b:
the punch 54 presses the film 4 at least partially against a flexible part 34 of the profiled strip 3 and/or
the punch 54 presses the film 4 at least partially against a hard part 36 of the profiled strip 3 and/or
the punch 54 presses the film 4 at least partially against a portion of a face 20, 21 of said glazed element 2 (said face portion being a hard part of a glazed element made of mineral glass or made of organic material).

Figure 5:
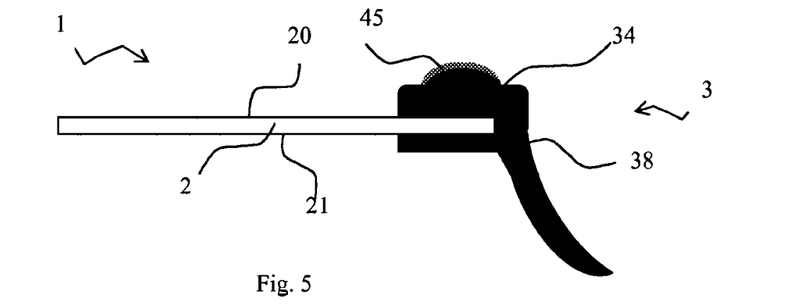
FIG. 5 illustrates a schematic cross-sectional view of a first embodiment variant of the glazing unit according to the invention after the manufacturing cycle from FIGS. 1 to 4.
Figure 6:
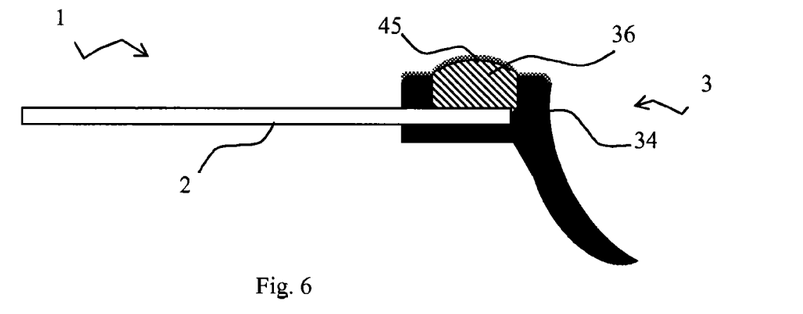
FIG. 6 illustrates a schematic cross-sectional view of an embodiment variant of the glazing unit according to the invention consisting of a combination of the first and second variants.

Thus, said coating 45 is located over one (or optionally several) lateral edge(s) of the glazing unit 1 and especially over the entire lateral perimeter of the glazing unit 1, and in particular the coating 45 adheres, over one or more lateral edges of the glazing unit 1:
to a flexible part 34 of the profiled strip 3, as can be seen in FIG. 5, or
both to a flexible part 34 of the profiled strip 3 and to a hard part 36 of the profiled strip 3, as can be seen in FIG. 6.

Although it is not illustrated, it is also possible for the coating 45 to adhere, over one or more lateral edges of the glazing unit 1:
both to a flexible part 34 of the profiled strip 3, and to a face 20, 21 of the glazed element 2, or
simultaneously to a flexible part 34 of the profiled strip 3, to a hard part 36 of the profiled strip 3 and to one or more faces 20, 21 of the glazed element 2.

The glazing units from FIGS. 5 and 6 are each provided with a flexible part 34 which finishes in a flexible lip (referenced 38 in FIG. 5). This flexible lip, intended to come into contact with the bodywork, may also comprise, on one part of its surface, a decorative coating according to the invention.

Generally, it is considered here that the flexible plastics are those which have, after processing, a hardness of less than or equal to 95 Shore A (in general from 55 to 95 Shore A), such as for example TPE, PVC, PU, EPDM, etc.; the hard plastics are those which have, after processing, a hardness of greater than 95 Shore A, such as for example PC, ABS, ABS-PC, etc.

Figure 7:
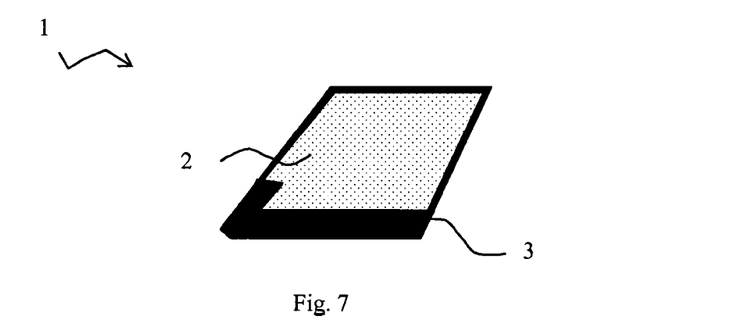
FIGS. 7 and 8 each illustrate a schematic perspective view of a glazing unit respectively before application of a decorative coating and after application of a decorative coating to two adjacent lateral edges of the glazing unit.

In FIG. 7 a glazing unit 1 is illustrated that comprises a glazed element 2 and a peripheral profiled strip 3. This profile is made of flexible plastic, but it could be with a flexible part and a hard part.

Figure 8:
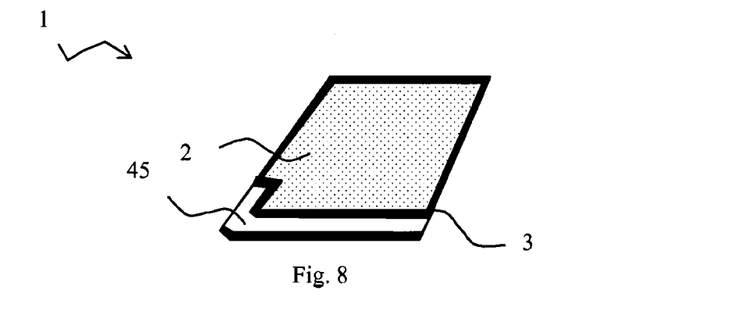

In FIG. 8 the same glazing unit 1 is illustrated, after carrying out the process according to the invention: a single decorative coating 45 was applied to the profiled strip 3, over two adjacent lateral edges of the glazing unit: the bottom edge, and also a part of the left edge. This coating was applied by only carrying out the pressing step b a single time.

The manufacturing device 5 according to the invention, seen in FIGS. 1 to 4, thus comprises a support 50 resting on the ground and comprises on the one hand a counter-form 52 attached to the support that receives said glazing unit 1 during the manufacture and on the other hand at least one movable punch 54 in order to press the film 4 against the glazing unit 1.

As seen in these figures, the punch 54, for example made of silicone, comprises a pad mounted so that it can move in vertical translation, but it could also comprise a roller mounted so that it can rotate about a horizontal axis.

Furthermore, as seen in FIG. 3, it is possible that decorative coating 45 remains between the cavities 46 (locations of the film 4/substrate 40 downstream of the punch when considering the direction of forward motion of the film and where there is no longer decorative coating).

However, to save decorative coating material, it is preferable to provide the film 4 such that it has a width identical to the desired width of the decorative coating of the glazing unit when this width is constant over the entire length of the coating; thus, if the transverse edges of the coating are straight or are complementary with one another, the entire decorative coating of the film is deposited on the glazing unit.

As can be seen in FIG. 4, the film 4 is wound onto a roll 56 which is unwound before pressing the film 4 against the glazing unit 1, and the substrate is then wound onto a roll 58 after the punch withdrawal step. These two rolls are here rotatably mounted on horizontal axes, the substrate roll 58 here being precisely rotated using a stepper motor (this rotation is illustrated by the arrow on this roll 58) and the roll 56 of film 4 being mounted in free rotation.

After the punch withdrawal step (FIG. 3) and the substrate withdrawal step (FIG. 4), the glazing unit 1 can be removed from the device 5 and a new glazing unit 1 can be positioned in the device as in the first step and the manufacturing cycle can restart.

If the film 4 is not changed, then the following glazing unit will comprise the same decorative coating 45; changing the film 4 makes it possible to apply a different decorative coating to a glazed element of the same series.

It should be noted that when the punch 54 presses the film 4 at least partially against a flexible part 34 of the profiled strip 3, as illustrated in FIG. 2, it is preferable for said flexible part 34 to be positioned on the counter-form 52 in order to create an effective counter-brace during the pressing step b. This counter-form 52 thus has a recess which is designed and produced to be the negative of the glazing unit at the location of said flexible part so as not to deform this flexible part during the pressing operation.

Should the decorative coating be provided with a heat-activated layer on its non-decorative face, that is to say on its face in contact with the substrate before the pressing step b, then during this pressing step b at least, or even also during step a or even during the entire manufacturing cycle, the punch 54 is heated.

In this case, the pressing operation may then be carried out at a temperature between 80 and 150° C., or even between 100 and 130° C., for example for a period between 1 and 20 seconds, or even between 2 and 5 seconds and, for example, at a pressure between 0.1 and 10 MPa, or even between 0.2 and 2 MPa.

In order to adhesively bond the decorative coating to the glazing unit, it is also possible to use UV radiation or ultrasound radiation; the duration and the pressure of the pressing operation may then consequently be adapted.

The decorative film is, preferably, constituted of a plastic matrix, present in which are pigmented particles of the desired color and/or appearance for the decoration of the glazing unit. The decorative film is, preferably, precut on the substrate which, itself, is continuous.

An important advantage of the process according to the invention is that the punch 54 may press the film 4 against the glazing unit 1 in a region of the glazing unit that is curved (that is to say not flat) and in particular the punch 54 may press the film 4 at least partially against a flexible part 34 of the profiled strip which is curved (that is to say not flat), as can be seen in FIG. 5.

In this case, the punch then has a contact surface that is designed and produced to be the negative of the glazing unit at the location of the pressing.

This is particularly advantageous when the glazed element is made of an organic material since, as explained previously, this material is in general chosen when the glazed element has a curvature such that it cannot be manufactured industrially by bending a glazed element made of mineral material.

It is furthermore possible for the decorative coating 45 to comprise a double curvature, that is to say a longitudinal curvature and a transverse curvature, the length and the transversal considered on the glazing unit being perpendicular.

The decorative coating is preferably applied to a part of the profiled strip which protrudes relative to the glazed element, and even more preferably applied to a part of the profiled strip which protrudes relative to the rest of the face of the profiled strip which is not decorated with the coating.

Thus, the coating is easier to apply.

For one and the same glazing unit series, the decorative coating may have various colors and/or various appearances (matt/shiny) or may not be present for a portion of the glazing units of the series.

The present invention is described in the foregoing by way of example. It is understood that a person skilled in the art is in a position to produce various variants of the invention without however departing from the scope of the patent as defined by the claims.

The invention claimed is:

1. A process for manufacturing a glazing unit, the process comprising, in order:
   (a) obtaining a glazing unit comprising a glazing element having at least one edge and at least one face and being equipped with a profiled strip, wherein the glazing element is glass and the profiled strip is plastic and wherein at least a portion of the profiled strip is on the face of the glazing element;
   (b) positioning the glazing unit on a support comprising a counter-form; and
   (c) pressing a film against at least a portion of a flexible part of the profiled strip of the glazing unit which protrudes outwards from the edge of the glazing element by applying a punch against the film, thereby adhering a decorative coating to at least a portion of the flexible part of the profiled strip, wherein the flexible part of the profiled strip has a hardness of from 55 to 95 Shore A;
   (d) raising the punch; and
   (e) withdrawing the film.

2. The process of claim 1, wherein, during (b), the flexible part is positioned on the counter-form.

3. The process of claim 2, wherein during (c), the punch presses the film at least partially against an outer face of the flexible part of the profiled strip, with an inner face of the flexible part of the profiled strip which is supported by the counter-form.

4. The process of claim 1, wherein, during (c), at least or during all the stages, the punch is heated.

5. The process of claim 1, wherein the film is wound on a roll which is unwound before pressing the film against the glazing unit.

6. The process of claim 1, wherein, during (c), the pressing is carried out for a duration between 1 and 20 seconds.

7. The process of claim 1, wherein, during (c), the pressing is carried out at a pressure between 0.1 and 10 MPa.

8. The process of claim 1, wherein, during (c), the pressing is carried out at a temperature between 80 and 150° C.

9. The process of claim 1, wherein at least a portion of the flexible part is curved and the punch presses the film against at least a portion of the curved portion of the flexible part.

10. The process of claim 1, wherein the punch presses the film against several lateral edges of the glazing unit.

11. The process of claim 1, the process comprising implementing a device, wherein the device comprises:
 a movable punch, which presses against the glazing unit on which a decorative coating is positioned, such that the decorative coating adheres to the glazing unit.

12. The process of claim 11, wherein the punch comprises a rotatably mounted roller or a translatably mounted pad.

13. The process of claim 1, wherein the decorative coating is adhered to a hard part of the profiled strip.

14. The process of claim 1, wherein the decorative coating is adhered to the face of the glazing element.

15. The process of claim 1, wherein the decorative coating is adhered to a hard part of the profiled strip and the face of the glazing element.

* * * * *